(12) United States Patent
Gross

(10) Patent No.: US 9,646,089 B2
(45) Date of Patent: May 9, 2017

(54) SYSTEM AND METHOD OF MODIFYING RANKING FOR INTERNET ACCESSIBLE DOCUMENTS

(75) Inventor: John Nicholas Gross, San Francisco, CA (US)

(73) Assignee: John Nicholas and Kristin Gross Trust, Berkeley, CA (US)

( * ) Notice: Subject to any disclaimer, the term of this patent is extended or adjusted under 35 U.S.C. 154(b) by 913 days.

(21) Appl. No.: 11/855,922

(22) Filed: Sep. 14, 2007

(65) Prior Publication Data

US 2008/0071773 A1 Mar. 20, 2008

Related U.S. Application Data

(60) Provisional application No. 60/826,019, filed on Sep. 18, 2006.

(51) Int. Cl.
G06F 17/30 (2006.01)

(52) U.S. Cl.
CPC ............... *G06F 17/30864* (2013.01)

(58) Field of Classification Search
CPC ................................. G06F 17/30864
USPC ............................ 707/2, 723, 722
See application file for complete search history.

(56) References Cited

U.S. PATENT DOCUMENTS

| 6,684,254 | B1 * | 1/2004 | Dutta ........................... 709/229 |
| 7,509,344 | B1 * | 3/2009 | Kamvar et al. | |
| 2005/0071465 | A1 * | 3/2005 | Zeng et al. ................... 709/224 |
| 2006/0059144 | A1 * | 3/2006 | Canright et al. ................. 707/5 |
| 2006/0155751 | A1 * | 7/2006 | Geshwind et al. ........... 707/102 |
| 2006/0294155 | A1 * | 12/2006 | Patterson ..................... 707/200 |

FOREIGN PATENT DOCUMENTS

EP 1517250 3/2005

OTHER PUBLICATIONS

"Manufacturing Dissent," http://dogfightatbankstown.typepad.com/blog/2005/06/manufacturing_d.html, Jun. 4, 2005, 2 pages.
"Nick Lewis: The Blog," http://www.nicklewis.org/node/335, Apr. 1, 2005, 5 pages.
Cohn, David, "CNN on the Spam Attack?," http://www.wired.com/culture/lifestyle/news/2005/05/67371, May 2, 2005, 2 pages.
Fetterly, Dennis et al., "Spam, Damn Spam, and Statistics," Seventh International Workshop on the Web and Databases (WebDB 2004), Jun. 17-18, 2004, Paris, France, 6 pages.
Metaxas, Panagiotis et al., "Web Spam, Propaganda and Trust," AIRWeb2005, May 10, 2005, Chiba, Japan, 9 pages.
Ntoulas, Alexandros et al., "Detecting Spam Web Pages through Content Analysis," WWW 2006, May 23-26, 2006, Edinburgh, Scotland, 10 pages.

(Continued)

*Primary Examiner* — Robert Stevens
(74) *Attorney, Agent, or Firm* — J. Nicholas Gross

(57) ABSTRACT

A system and method is disclosed for altering a relevance ranking for a web accessible document or page containing target content. A set of pages containing the content in question are intentionally imbued with spam features (or other characteristics indicative of low value relevance) so that a search engine is less likely to index or retrieve such page in response to a query.

7 Claims, 1 Drawing Sheet

(56) References Cited

OTHER PUBLICATIONS

Wu, Baoning et al., "Identifying Link Farm Spam Pages," preprint of an Article accepted for publication in Proceedings of the 14th International WWW Conference, May 10-14, 2005, Chiba, Japan, 10 pages.
Glaser, Mark, "Companies subvert search results to squelch criticism," http://www.ojr.org/ojr/stories/050601glaser/print.htm, posted Jun. 1, 2005, 7 pages.
Pedone, Michael; "Google Bowling: How Competitors Can Sabotage You; What Google Should Do About It," http://www.webpronews.com/expertarticles/2005/10/27/google-bowling-how-competitors-can-sabotage-you-what-google-should-do-about-it, Oct. 27, 2005, 3 pages.
"GoogleBowling SEO Black Hats for Hire," http://seoblackhat.com/2005/09/01/google-bowling-seo-black-hats-for-hire/, Sep. 1, 2005, 3 pages.
"Google Bowling: What is it? Does it Work?," http://seoblackhat.com/category/googlebowling/Miscellaneous dates Sep. 1, 2005-Jul. 22, 2009, 8 pages.

\* cited by examiner

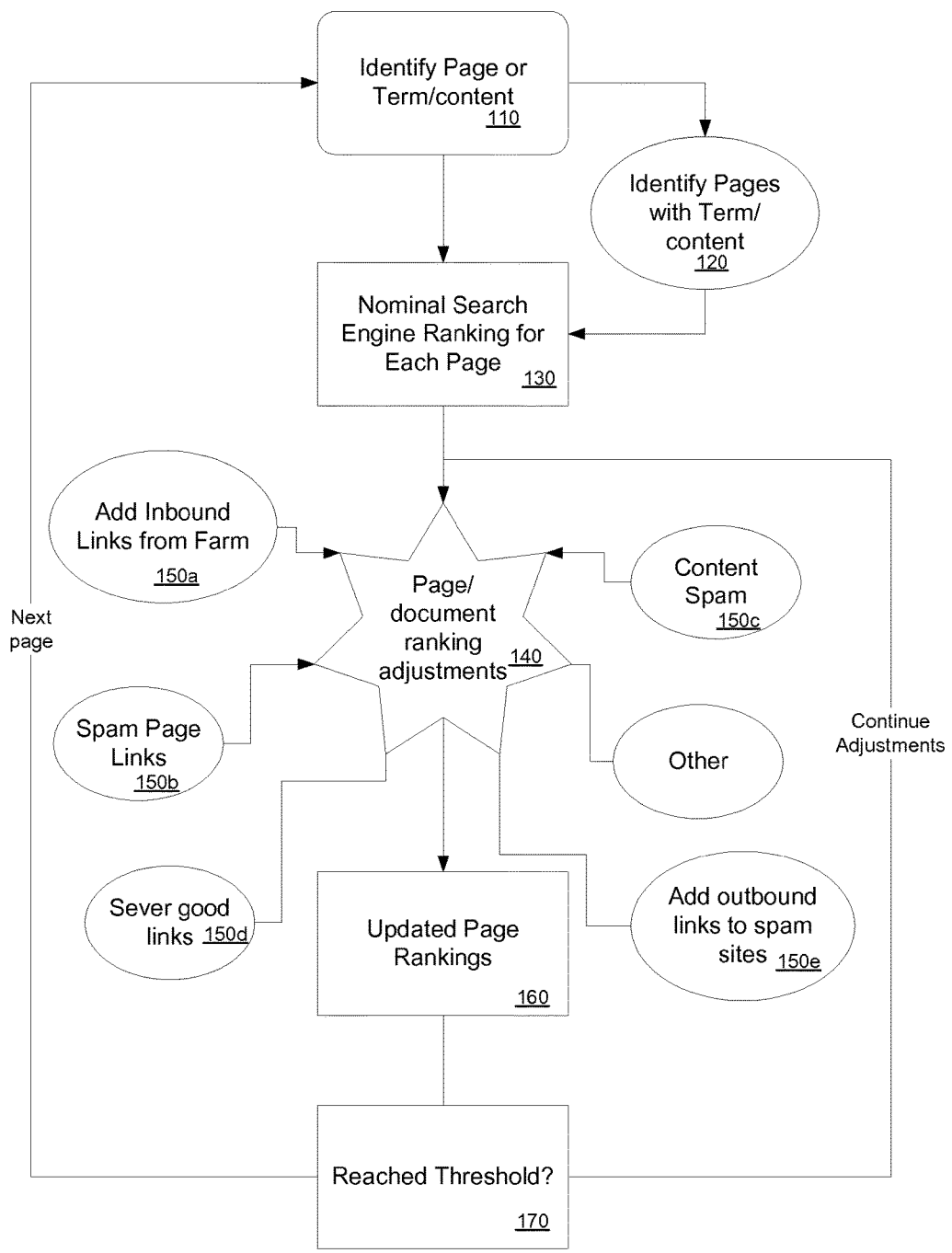

SYSTEM AND METHOD OF MODIFYING RANKING FOR INTERNET ACCESSIBLE DOCUMENTS

RELATED APPLICATION DATA

The present application claims the benefit under 35 U.S.C. 119(e) of the priority date of Provisional Application Ser. No. 60/826,019 filed Sep. 18, 2006 which is hereby incorporated by reference herein.

FIELD OF THE INVENTION

The present invention relates to generally to electronically searching sets of documents and more particularly to influencing search engine result rankings of documents, especially by authors of such documents.

BACKGROUND

Where information is stored in highly structured forms, searching follows well-defined rules. For example, if information about customers is stored in an orders database with each unique customer assigned a unique customer number and each unique item assigned a part number, identifying all of the customers who ordered a particular item can be found by issuing a command to a database manager of the form "table=orders with item-ID=item1 output customer-ID". However, where information is not as structured, searching is doable, but is more complex. Searching is essential where the user cannot be expected to review the entire set of information looking for what is of interest.

For example, the information might be in the form of unstructured documents. There are many well-known techniques for searching a corpus of documents, where a corpus is some defined set of units of information each referred to as a "document". A common approach is to index the corpus to arrive at a reverse index indicating where each word (with "stop words" often omitted) is stored with a list of which documents (and possibly locations in those documents) contain the word. A search engine then accepts queries from users (which can be human users using an input device or might be a computer or automated process supplying the queries), consults the index and returns a result set comprising one or more "hits", wherein a hit is a document in the corpus that is deemed responsive to the query. The result set might comprise the documents themselves, summaries of the documents, and/or references or pointers (such as URLs) to the documents.

Of course, an ideal search engine only returns documents that are in fact responsive to the query, but a search engine cannot always be perfect and thus may return hits that the search engine deems are responsive to the query (i.e., match the request represented by the query), but are not, in the user's opinion, responsive. In some instances, the search engine returns a result set that is exactly responsive. For example, where the query is a Boolean expression "world AND facts BUT NOT weather" and the index is fully up-to-date, a search engine can return exactly the result set of all documents having the words "world" and "facts" that do not also have the word "weather" in them. Unfortunately, search engines that are limited to strict Boolean queries are not that useful where there are large numbers of documents, created in an uncontrolled fashion without a "clean up" process in advance of indexing. Furthermore, users often prefer to provide less structured queries, leaving the search engine to compute possible intents and alter search results accordingly. As just one example, if there were a document labeled "world fact" and did not mention weather, the above-mentioned search engine would miss that document, as it was only looking for the exact string "facts".

In the general case, searching involves receiving a search query, which might be a string of text or a more structured data object, possibly adding in modifiers from context, such as user demographics, time of day or previous queries, determining from that query object a set of documents from a corpus of documents that are deemed to match the query and returning a result set (or part of a result set if the set is too large).

One heavily searched corpus is the collection of documents stored on servers accessible through the Internet (a global internetwork of networks) and/or similar networks. The documents might be accessible via a variety of protocols (HTTP, FTP, etc.) in a variety of forms (images, HTML, text, structured documents, etc.). This particular corpus presents several difficulties. For one, the number of documents is not known, as there is no central authority that tracks the number of servers and the documents stored on those servers. For another, those documents are constantly changing. Yet another difficulty is that there are a large number of documents. With so many documents available, a typical result set is larger than would be of interest to a typical user. For example, in response to the query "recent sports scores", a search engine with a respectable index would return a results set of several hundreds of thousands of hits. Thus, a typical result set can be assumed to be too large for its entirety to be of use to the user.

A user cannot be expected to review hundreds of thousands of documents in response to a search query. As a result, the typical search engine will return only a small set (e.g., four, ten, a page full, one hundred, etc.) of results and provide the user the ability to examine more hits than just the initial set, such as by pressing a button or scrolling down. Since users may except to find an acceptable hit in the first page of search results, it is good for a search engine to be able to rank the hits and present the hits deemed most relevant first. The result set might also be filtered using filter criteria so that some documents that would otherwise be part of the result set are eliminated.

With ranking done before display of a result set, the ranking ensures that the higher rated documents are presented first. This process leads to the question of what constitutes a high ranking. Naturally, if someone has set up pages for an e-commerce site and hopes to bring in large amounts of traffic, they would consider that their pages are the highest rated or should be the highest rated, regardless of searcher intent. By contrast, searchers who are not searching in order to make a purchase transaction would actually consider such pages to be quite irrelevant and would want those pages ranked lower. Thus, different entities have different views of how documents in a result set are ranked.

Some businesses known as "search engine optimizers" or SEOs offer a service wherein they advise their customers how to increase the rankings of the customer's web pages, to increase visibility of those pages among searchers in hopes of increasing traffic and therefore sales. Some less than honorable SEOs might advise the use of web spam techniques, wherein false or misleading information is placed in the path of a search engine's crawler that would fool the search engine into thinking that the customer's web pages are more important than they really are, in hopes of being ranked higher. One approach to up-ranking pages is to add irrelevant words to invisible portions of a web page to ensnare more search queries. Another approach is to create a large number of dummy pages (often collectively referred to as a "web spam farm") that all mention a target page in hopes that a search engine, noting all of those mentions, will up rank the target page.

In the face of the techniques, and since the typical patron of a search engine wants results unbiased by the efforts of SEOs and those who would artificially increase their rankings, search engine operators try to counter those efforts. Some have set up automated systems to detect this artificial inflation of rankings (sometimes referred to as "web spam"). Search engine operators do have manual intervention, for example, if someone complains that someone is generating web spam or that their own pages are being unfairly down ranked, but the operators have limited capacity and often are not focused on these requests.

The corpus used in these examples is the set of documents available over the Internet, a subset of which are hyperlinked documents collectively referred to as the "World Wide Web" or just the "Web". Where the documents are pages of the Web, typically formatted as HTML documents, they might also be referred to as pages or Web pages.

Matching, such as to bring a page into a result set, is according to operating rules of the search engine. For example, where the search engine allows for fuzzy searches, a query for pages containing "world" and "soccer" and "scores" and 2006 might include pages that do not strictly contain all of those words. Other search engines might only return pages that have all of those words or synonyms of those words.

Some limited attempts to solve this problem have been mentioned in the prior art. For instance in a blog found at www(dot)nicklewis(dot)org/node/335 titled *Nick Lewis: The Blog* the author speculates that certain content was added intentionally in posting by a third party for the purpose of causing a search engine (Google) to punish the rank rating for the page. An online article entitled "Companies subvert search results to squelch criticism" available at www(dot)ojr(dot)org/ojr/stories/050601glaser/ contains a similar description of such behavior, including instances where positive pages are created to try and boost rankings. In this example the author, because he had direct control over the content of the blog, was able to directly remove the offending materials and avoid the search engine "downgrading."

Nonetheless there is a need to better overcome the shortcomings of the prior art.

SUMMARY OF THE INVENTION

An object of the present invention, therefore, is to reduce the aforementioned limitations of the prior art.

DESCRIPTION OF THE DRAWINGS

FIG. 1 illustrates a page modification process implemented in accordance with an exemplary embodiment of the present invention.

DETAILED DESCRIPTION

Embodiments of the present invention can be used to down rank target pages out of existence or effectively out of existence when their authors want those pages to become less prevalent by, in effect, causing search engines to treat those pages as web spam even though the pages are not. Since the typical search engine's web spam filter (which might operate by down ranking web spam pages or filtering them out of results altogether) is an automated process, authors can have their obsolete pages down ranked or filtered without having to rely on a search engine operator's manual procedures or the cooperation of a web site content manager (i.e., such as a social networking site operator, a blogger, etc.).

There are many reasons why an author would want pages to "disappear." The web pages might be obsolete. They may refer to products no longer offered by the author. This is often the case where a programmer creates a program, creates web pages to sell copies of the program to others, and then decides to stop maintaining the program and stop offering it for sale. However, if those web pages remain in search engine results, the programmer might continue to get calls about the program when the programmer does not want to be involved anymore. A web author can simply delete the desired pages from the author's web site or presence, but often search engines will maintain copies of the pages in their caches and/or continue to reference a deleted page in its index. It will be apparent to those skilled in the art that other "stale" business information (such as terminated phone numbers, old addresses, discontinued products, etc.) can be deemphasized and retired in this fashion.

Another reason to remove a page from results pages is if the author has changed positions on an issue or does not have the same ideas as when his or her pages were created. For example, if the author at one time took a particular position on a political issue but over time changed to the opposing position, the author would not want pages representing the author's earlier views to persist. This can be of particular interest to job-seekers. If, for example, a job seeker had posted embarrassing web pages of the job seeker's past and much later applies for a job with an employer known to search for job seekers' web pages, the employer might get the wrong impression of the job seeker from outdated, possibly unflattering web pages.

Possibly another reason to want to down rank pages is because the page contains personal information unwittingly posted that a person wants removed. For example, if a user's e-mail address was unintentionally posted on a web page such that it could lead to an increase in e-mail spam driven by spammers who harvest e-mail addresses from web pages, the user would want such pages to be made unavailable to spam crawlers.

Often it is difficult to obtain search engine operator or other web site manager cooperation. The search engine operator may simply be slow or unwilling to remove a target page from its index. In some cases, the search engine operator might have onerous requirements for proving a requester's right to have a page removed from their index. Also, many search indices have an inherent lag between when something changes and it is reflected in the index.

These difficulties can be overcome with embodiments of the down ranking system and methods described herein. Such tools would allow individuals and businesses to selectively target and remove potentially offensive personal or other content accessible over the Internet. This is applicable to other networks and corpuses, but is especially useful with the Internet because almost anyone can add content to the collection of documents available over the Internet and almost anyone can access and/or search for such documents.

Search engines often have automated web spam detectiors. Examples are described in Fetterly et al., "Spam, Damn Spam, and Statistics—Using Statistical Analysis to Locate Spam Web Pages", Seventh International Workshop on the Web and Databases (WebDB 2004), Jun. 17-18, 2004, Paris, France (currently available at http://research(dot)microsoft(dot)com/users/najork/webdb2004.pdf), Metaxas et al., "Web Spam, Propaganda and Trust", AIRWeb2005, May 10, 2005, Chiba, Japan (currently available at http://airweb(dot)cse(dot)Lehigh(dot)edu/2005/metaxas.pdf), Ntoulas et al., "Detecting Spam Web Pages through Content Analysis", WWW 2006, May 23-26, 2006, Edinburgh, Scotland (currently available at http://research(dot)Microsoft(dot)com/research/sv/sv-pubs/www2006.pdf). These systems generally work by examining a variety of factors, including the actual content of web pages, their linking behavior, or their rate of change, to name a few. Other techniques are also known.

Some systems are further specialized for finding larger collections of spam pages which are used to artificially boost the rating of a target page with outbound links. See, e.g., Wu et al., "Identifying Link Farm Spam Pages", Proceedings of the 14th International WWW Conference (2005) (currently available at http://www(dot)cse(dot)Lehigh(dot)edu/~brian/pubs/2005/www/link-farm-spam.pdf) and EP Application No. 1 517 250 by Najorc entitled "Improved Systems and Methods for Ranking Documents Based Upon Structurally Interrelated Information" to name a few. Generally, these systems work by examining linking behavior exhibited by a target set of pages and if their linking exceeds a certain threshold, the entire collection is identified as a "link farm" or "spam farm."

In embodiments of the present invention, pages are eliminated from view by intentionally imbuing them with spam characteristics so that the conventional search engines will identify/treat them as spam, and thus compute/downgrade their relevance in response to a query. In other words, if a majority of web pages which match the content "Mary Smith" and contain a photograph are earmarked or classified as spam, the search engines are unlikely to retrieve such pages and associated content in response to a query.

In this respect, therefore, a down ranking system as described herein attempts to convince the search engine, in an automated fashion using existing features and side effects of the search engine, that the pages in question are untrustworthy, undesirable, and therefore should not be indexed in the first place or retrieved in response to a query. Thus, the combination of known spam content/sites and very accurate classification schemes of search engines can be exploited to the advantage of persons wishing to modify/reduce the visibility of certain target content/pages.

FIG. 1 illustrates an example of a web page modification process 100 employed in the present invention that is adapted for modifying a ranking of a target page.

At step 110, the target page, term or content is identified. In the latter case, a search can be conducted at step 120 to locate and identify a set of target pages which contain the terms/content to be neutralized or downgraded.

During step 120 a nominal search engine ranking is determined for the page or term/content. This can be done in any conventional fashion, including simply by performing queries directed to the target pages/content, and monitoring search results including placement of such pages within retrieved results, highlighting of offending content, etc. Note that in some instances a search engine operator provides tools for estimating or determining the actual perceived ranking value of a particular page to a search engine, and this value can also be measured as well if desired.

At step 140 the ranking of the page(s) are adjusted using a variety of conventional techniques. As noted above, the identity of link farms are well-known; thus, an operation 150*a* can be performed to provide a significant number of inbound links to the page in question from one or more of such spam farms. Note that as the invention becomes more prevalent in use some link farm operators may in fact promote aspects of their operations as page "black holes" or "page sinks" for the purpose of fooling search engines. In some instances it may be more desirable for an entity to develop and cultivate a set of dedicated black holes or page sinks of its own, to reduce costs, improve control, greater convenience, etc.

Other options of course, include adding spam content links at other sites (such as at blogs and the like) at 150*b* so that the search engine will detect the same and downgrade the page for this reason as well.

Moreover if the user still has access to the page in question, there are other things he/she can do, including severing "good" links as shown in 150*d*. By removing inbound/outbound links at the page, the search engines again typically will reduce a relevance of such page. Similarly at 150*c*, a user can sometimes directly include spam in a page, or make it spam-like by frequent content changes, to trigger a negative reaction by a search engine. Another option would be to add or change outbound links to other known spam pages as shown in 150*f*, on a frequent basis.

Again, any known trigger or signature used by search engines to identify a page as spam can be employed in the present invention, and those skilled in the art will appreciate that such systems will evolve over time to identify spam in new ways not contemplated to date.

At step 160 the ranking of the page is estimated and/or measured again, in a manner similar to that explained above during step 130. One side effect, of course, is that the actual ranking of a page or pages may in fact go up for awhile until the search engines identify and classify the page as spam. Nonetheless given the increasing rate of indexing of such systems, it is likely that improvements can be seen in a matter of a few weeks. The invention can be combined with other conventional techniques as well to neutralize offending/target web pages.

At step 170 the system determines if the page has been reduced below a threshold target. The latter for example may be as simple as determining whether the pages shows up in a first entry screen of search results directed to specific key words, terms or content. Alternatively as noted earlier the pageranking or other visible metric may be examined to see if it is below the desired value (i.e. on a scale of 0-10). Other examples will be apparent to skilled artisans. The process is repeated until each page in the identified page set is treated effectively to make it as spam-like as feasible.

It will be appreciated that the types of systems which can embody the present invention can include a variety of conventional hardware platforms known in the art, including data processing equipment and computers with a wide range of computing/storage resources and capabilities. Accordingly, the details of such software and hardware implementations are not material except as discussed herein with reference to specific aspects of the invention, and they will vary significantly from application to application based on a desired performance.

Finally, while not explicitly shown or described herein, the details of the various software routines, executable code, etc., required to effectuate the functionality discussed above are not material to the present invention, and may be implemented in any number of ways known to those skilled in the art based on the present description.

Other benefits will be apparent to those skilled in the art.

It will be understood by those skilled in the art that the above is merely an example of an ad delivery system/method and that countless variations on the above can be implemented in accordance with the present teachings. A number of other conventional steps that would be included in a commercial application have been omitted, as well, to better emphasize the present teachings.

What is claimed is:

1. A method of modifying search results of a search engine comprising:
   (a) identifying a first target page, wherein said first target page has a first ranking used by the search engine in responding to queries directed to a target term;
   (b) identifying one or more spam pages;
   (c) automatically causing said one or more spam pages to create explicit links to said first target page with a computing system;
   wherein said explicit links are created by the computing system at a frequency rate sufficient to reduce said first ranking and are included as hypertext markup language (HTML) content in said one or more spam pages;
   (d) repeating any of steps (b) and/or (c) until said first ranking used by the search engine is reduced below a target threshold, without modifying how the search engine processes input queries.

2. The method of claim 1, wherein prior to step (b), directing a first query to said target term such that the search engine presents a set of top N results that includes said first target page, and such that after step (d), said first target page does not appear within said set of top N results.

3. The method of claim 1 wherein said target term is a proper name.

4. The method of claim 1, wherein said spam pages are obtained from an automatic search engine spam filter routine.

5. The method of claim 1, further comprising repeating steps (a) to (d) for a set of second target pages which appear in a set of search results presented by the search engine in response to a query to said target term.

6. The method of claim 1 further comprising generating a set of spam pages to be used during step (c).

7. The method of claim 1, wherein said search engine is caused to not include said first target page in a document index used for responding to said queries.

* * * * *